S. P. GOMELLA.
SLACK ADJUSTER.
APPLICATION FILED JULY 18, 1912.

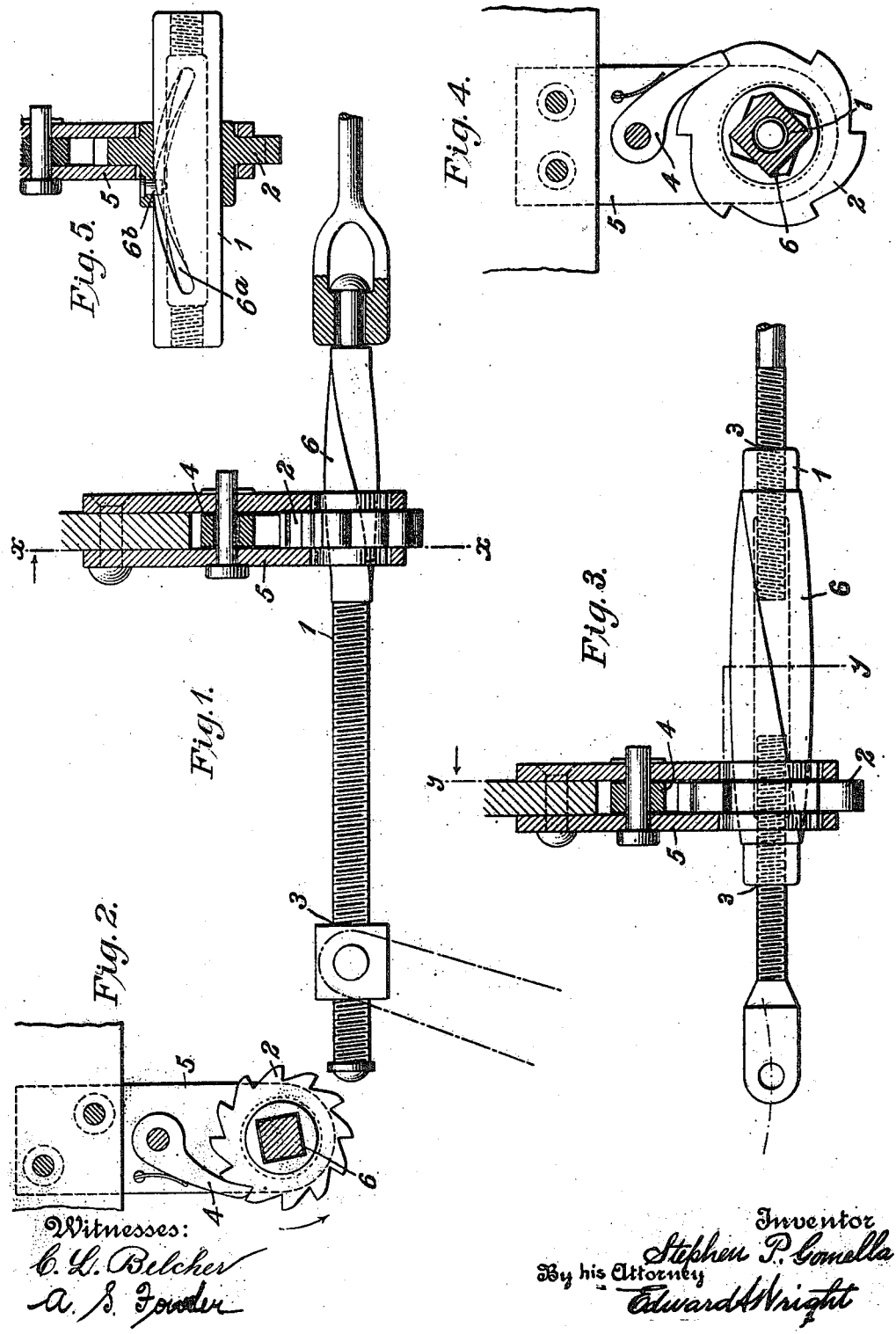

1,045,833.

Patented Dec. 3, 1912.
2 SHEETS—SHEET 2.

Witnesses:
C. L. Belcher
A. S. Fowler

Inventor
Stephen P. Gomella
By his Attorney
Edward A. Wright

UNITED STATES PATENT OFFICE.

STEPHEN P. GOMELLA, OF TOMSK, RUSSIA.

SLACK-ADJUSTER.

1,045,833.  Specification of Letters Patent.  Patented Dec. 3, 1912.

Application filed July 18, 1912. Serial No. 710,104.

*To all whom it may concern:*

Be it known that I, STEPHEN P. GOMELLA, a subject of the Russian Empire, residing at Tomsk, Russia, have invented a certain new and useful Improvement in Slack-Adjusters, of which improvement the following is a specification.

This invention relates to slack adjusters for railway brakes, and more particularly fluid pressure brakes, as now usually employed upon railway cars. In this class of apparatus, the fluid, such as compressed air, is admitted to the brake cylinder and acts upon the piston therein, and through the connected system of rods and levers, to force the brake shoes against the wheels. As the brake shoes wear down, and the brake rigging becomes stretched, the brake piston must necessarily travel farther in its cylinder in order to bring the shoes up to the wheels, and since the air brake system is designed to give certain cylinder pressures for a given constant travel of the brake piston, it is important that the so-called "slack", produced by wear in the brake shoes and rigging, be taken up, in order to maintain a substantially constant travel of the brake piston and an efficient and satisfactory braking pressure.

Various forms of automatic slack adjusting devices have been designed for this purpose, and the object of my invention is to provide an improved device of this character, which shall be simple in construction, durable and efficient in operation, requiring very little attention for maintenance, and adapted for use with power or hand brakes on either freight or passenger cars.

Figure 6:
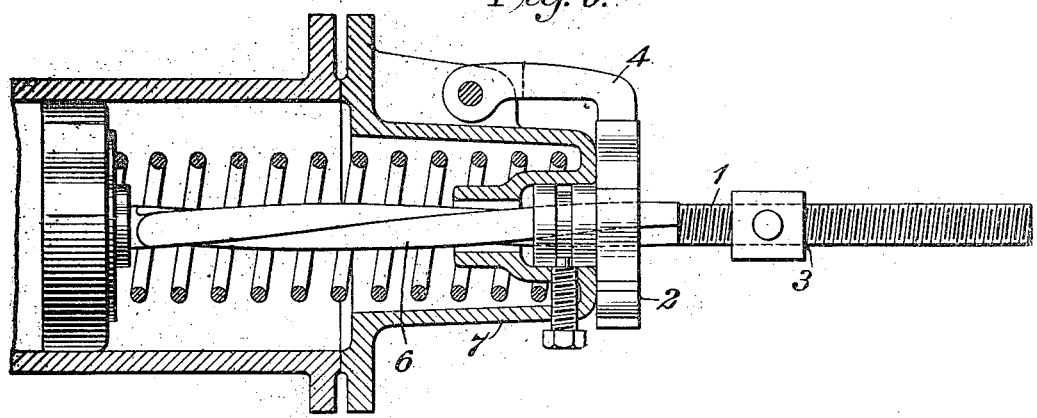
Figure 7:
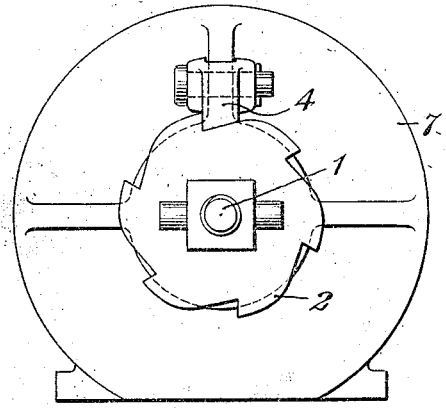

In the accompanying drawings: Figure 1 is a side elevation of a slack adjusting device embodying my improvement, the fixed support for the ratchet wheel being indicated in vertical section; Fig. 2, a transverse section taken on the line *x—x* of Fig. 1; Fig. 3, a view similar to Fig. 1, but showing a slight modification; Fig. 4, a transverse section of the same taken on the line *y—y* of Fig. 3; Fig. 5, a detail view, showing a modified form of helical surface; Fig. 6, a longitudinal section showing a modification of my improvement, as applied to the piston rod of the brake cylinder; Fig. 7, an end view of the same; and Fig. 8, a sectional view similar to Fig. 6, but showing a modified form of piston rod.

My improvement may be applied in connection with any movable member of the brake rigging, such as the brake piston rod, or any pull rod or push rod of the system, which may have a screw connection with a lever or with another section of the rod. If it be applied to a tension rod, the adjustment will obviously be made so as to shorten the connection as the wear takes place, while in the case of a compression rod, the adjustment would be made to lengthen the connection. In either case, the rod coöperates with a pawl and ratchet mechanism, which is mounted in a fixed or stationary position relative to the longitudinal movement of the rod and engages with the latter through a helical surface having the movement with the rod in such a manner that the longitudinal movement of the rod and this surface in one direction causes the ratchet wheel to rotate, and if the length of movement or travel is sufficient to turn the ratchet wheel sufficiently to permit the pawl to drop into the next notch of the ratchet wheel, it is held against turning on the back stroke thereby causing the rod to rotate the screw connection to take up slack during the return or release movement of the rod produced by the usual release springs. If ratchet wheel has the teeth in opposite direction the rotation of screw connection will be during the direct movement when the application of brake takes place.

As shown in Figs. 1 and 2 of the drawing, the movable member or rod, 1, of the brake rigging is provided with a screw connection, 3, to an attached lever block or to another section of the rod, and a portion of the rod is provided with one or more helical surfaces, 6, four such surfaces being shown, making the section of this portion of the rod square. This portion of the member or rod having the helical surface extends through a correspondingly shaped opening in the center of the ratchet wheel, 2, which is rotatably mounted upon a fixed support, 5, to which is also pivoted the pawl, 4, for engaging the teeth of the ratchet wheel. The support, 5, may be fastened to the car frame work, or to the truck frame, or to any convenient object.

When the brakes are applied, the rod or member moves in one direction, for instance, toward the left, and the curved portion having the helical surface sliding through the ratchet wheel rotates the same in the direction of the arrow, Fig. 2, and if the movement and consequently the rotation, is sufficient for the pawl, 4, to fall into the next notch, it is plain that the rod will be rotated upon the return movement by means of the cam surface, thereby adjusting the screw connection to take up the slack and maintain the brake piston travel substantially constant. The pitch of the cam surface is properly designed so that the ratchet wheel will be rotated one or more notches when the piston travel becomes excessive due to wear of the brake shoes and rigging. If the travel is not sufficient to advance the pawl one notch upon the ratchet teeth, the wheel simply rotates a distance less than one notch on the outward movement, and back again upon the reverse movement without turning the screw connection, as will be readily understood. The pawl may be held down by gravity or by a spring in the usual manner and may be raised out of engagement with the ratchet teeth when it is desired to turn the wheel and rod for resetting the screw at the time new brake shoes are inserted.

In the construction illustrated in Figs. 3 and 4, the movable member, 1, is shown in the form of a hollow rod or sleeve having a threaded or screw connection, 3, at each end with other sections of the rod, the helical surfaces being formed upon the exterior of the sleeve which extends through the ratchet wheel. The operation of this form of the device is the same as that before described, except that the screw connection is adjusted at both ends of the sleeve instead of at one point only.

The helical surface by which the ratchet wheel is rotated by the longitudinal movement of the rod may assume various forms, as shown for instance, in Fig. 5, where a curved slot, 6ª, is formed in the rod or sleeve, into which projects a pin, 6ᵇ, carried by the ratchet wheel. The operation, however, is substantially the same in either case.

Figure 8:
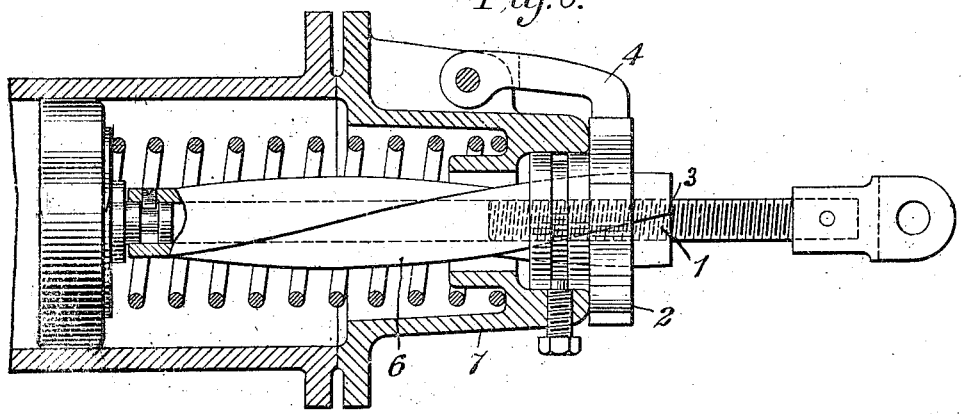

Figs. 6 and 7 show a convenient way of mounting the pawl and ratchet wheel upon the brake cylinder. In this case the brake piston rod, 1, constitutes the movable member having the helical surface extending through the fixed ratchet wheel, 2, which is mounted to rotate upon the non-pressure head, 7, of the brake cylinder, the pawl, 4, also being pivoted to the cylinder head as shown. The piston rod may be either rigid with the piston, as shown in Fig. 6, or may preferably be mounted so as to have a rotary movement relative thereto as shown in Fig. 8.

The slack adjusters herein described can operate in the opposite direction, that is, when brake is applying, but in this case the ratchet wheel 2, in Figs. 1 to 8, must be so adjusted as to have the teeth in the opposite direction.

It will now be seen that in all of the modifications the movable member or rod has a longitudinal movement relative to the ratchet wheel and engages therewith through a helical surface which produces a rotation of the wheel to a succeeding notch of the pawl upon the outward movement, and a rotation of the rod to adjust the screw connection and take up the slack upon the return or release movement of the brake rigging or upon direct movement of the brake rigging, when the brake is applying.

I am aware that prior to my invention slack adjusters have been made with a movable ratchet wheel and a fixed cam surface, which adjusted the slack on part of the piston travel, and I therefore do not claim such combination.

Having now described my invention, what I claim as new and desire to secure by Letters Patent is:

1. In an automatic slack adjuster, the combination with a movable member of the brake rigging having a screw connection and a helical surface, of a pawl and ratchet wheel fixed relative to longitudinal movement of said member and having an opening engaging the helical surface to rotate the ratchet wheel and screw connection.

2. In an automatic slack adjuster, the combination with a movable member of the brake rigging having a screw connection, of a ratchet mechanism, the member having a longitudinal movement in the ratchet wheel, and one of said parts being provided with a sliding helical surface for rotating said screw connection and ratchet wheel.

3. In an automatic slack adjuster, the combination with a ratchet mechanism, of a member of the brake rigging having a screw connection and a longitudinal movement relative to the ratchet wheel, said parts being provided with engaging sliding helical surfaces adapted to rotate said screw connection and ratchet wheel.

4. In an automatic slack adjuster, the combination with a movable member of the brake rigging, of a pawl and rotatively fixed ratchet wheel, said member and ratchet wheel having engaging sliding surfaces adapted to rotate the ratchet wheel when the member moves in one direction, and to rotate the screw connection when the member moves in the opposite direction.

5. In an automatic slack adjuster, the combination with a movable member of the brake rigging having a screw connection, of a pawl and ratchet wheel rotatively fixed on a support, said parts having coöperating sliding helical surfaces adapted to cause a rotation of the ratchet wheel by the longitudinal movement of the brake rigging member.

6. In an automatic slack adjuster, the combination with a movable member of the brake rigging having a screw connection, of a pawl and ratchet wheel mounted on a stationary support, said member extending through the ratchet wheel and provided with a sliding helical surface for rotating said wheel.

7. In an automatic slack adjuster, the combination with a rod having a screw connection movable with the brake rigging, of a pawl and ratchet wheel mounted on a fixed support, said rod extending through the ratchet wheel and provided with a sliding helical surface engaging a corresponding surface in the opening through said wheel.

8. In an automatic slack adjuster, the combination with the brake piston rod having a screw connection, of a pawl and ratchet wheel mounted on the brake cylinder, said rod extending through the ratchet wheel and having a sliding helical surface engaging therewith.

9. In an automatic slack adjuster, the combination with a brake cylinder, and piston rod having a screw connection, of a ratchet wheel rotatably mounted on the cylinder, the piston rod extending through the ratchet wheel and engaging therewith by a sliding helical surface to cause the rotation of said ratchet wheel by the longitudinal movement of the rod.

10. In an automatic slack adjuster, the combination with a brake cylinder, piston and rod, the rod being rotatably mounted relative to the piston and having a screw connection, of a ratchet wheel rotatably mounted on the cylinder, and a pawl also pivoted upon the cylinder, the piston rod being provided with a sliding helical surface and extending through said ratchet wheel.

In testimony whereof I have hereunto set my hand.

STEPHEN P. GOMELLA.

Witnesses:
C. L. BELCHER,
A. S. FOWLER.